United States Patent Office 3,440,148
Patented Apr. 22, 1969

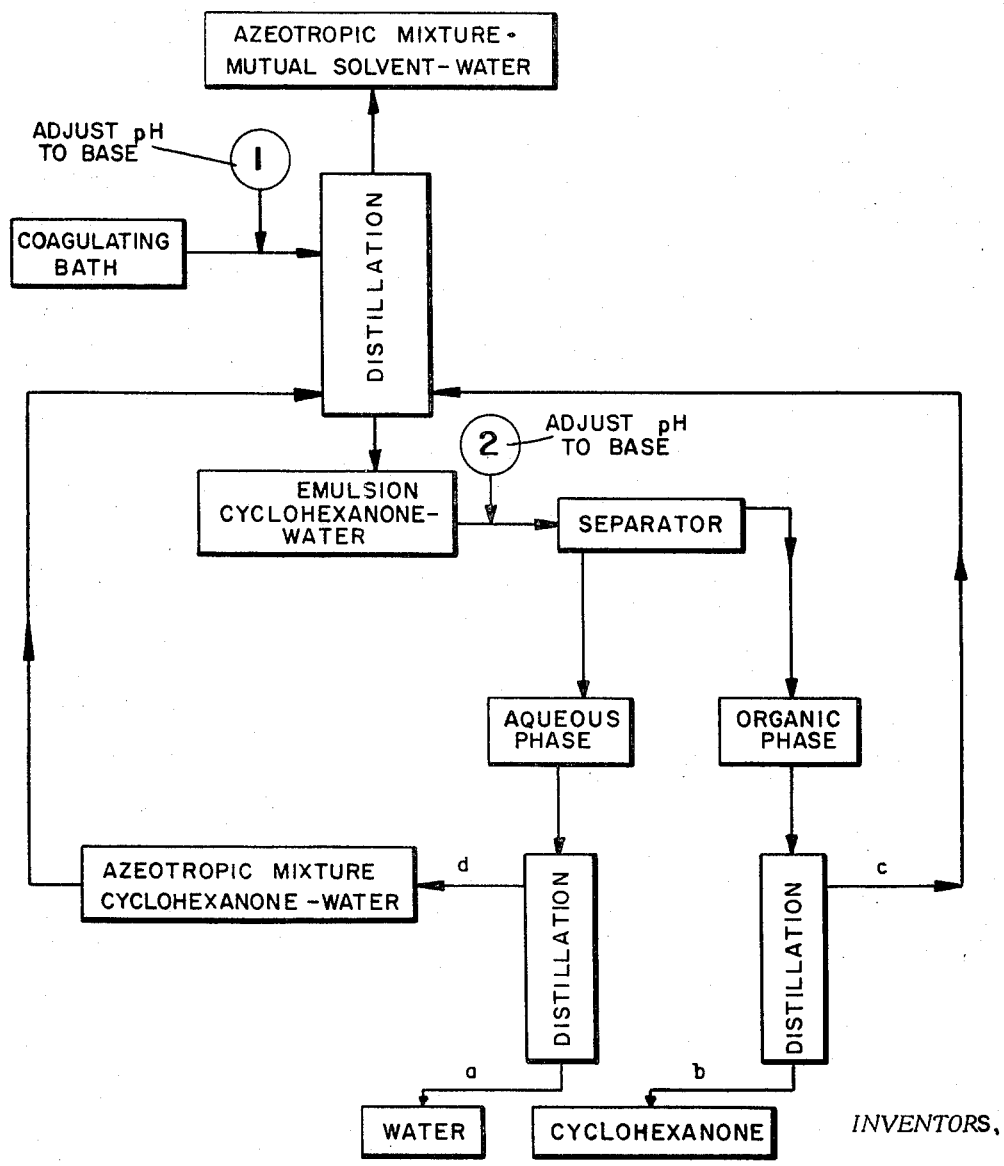

3,440,148
METHOD FOR RECOVERING THE COMPONENTS OF A COAGULATION BATH USED IN THE SPINNING OF POLYVINYL CHLORIDE
Paolo Melacini, Mestre, Venezia, and Silvio Trevisi, Padova, Italy, assignors to ACSA Applicazioni Chimiche S.p.A., Milan, Italy
Filed Jan. 13, 1966, Ser. No. 520,373
Claims priority, application Italy, Jan. 27, 1965, 1,720/65
Int. Cl. B01d 3/34, 3/14
U.S. Cl. 203—33    10 Claims

ABSTRACT OF THE DISCLOSURE

A process for the recovery of cyclohexanone from a coagulation bath comprising a ternary solution of cyclohexanone, water and a mutual solvent therefor, which bath is used in the wet spinning of high syndiotactic polyvinyl chloride, comprising subjecting to distillation said coagulation bath comprising a ternary solution of cyclohexanone, water and a mutual solvent therefor; whereby there is obtained as distillation bottoms an emulsion of cyclohexanone and water; allowing said emulsion, the pH thereof having been adjusted to a basic value greater than about 8, to separate into two phases, a first phase consisting of cyclohexanone saturated with water and a second phase consisting of water saturated with cyclohexanone; and thence recovering cyclohexanone from the said separated phases.

---

The present invention relates to a method for recovering the components of a coagulation bath used in the spinning of high syndiotactic polyvinyl chloride, and, more particularly, this invention relates to a process for recovering cyclohexanone from a coagulation bath used for the spinning of polyvinyl chloride having a high index of syndiotacticity (IS).

By the term "polyvinyl chloride having a high index of syndiotacticity (IS)" as used in the present description and in the appended claims, are meant homopolymers of vinyl chloride having a syndiotactic index of more than 2 (the index of syndiotacticity being defined by the absorption ratio to the I.R. bands D635 and D692 cm.$^{-1}$, as described by Burleigh, J.A.C.S., 82, p. 749 (1960)), as well as its copolymers or blends comprising at least 85% by weight vinylchloride.

It is known, in the art, to spin solutions of high syndiotactic polyvinyl chloride in cyclohexanone, using a ternary solution of cyclohexanone, water and a mutual solvent as the coagulation bath.

The various components of the above mixture are proportioned in such a way as to effect a complete solution, according to a miscibility diagram of these components. Best results are obtained with a coagulation bath comprising from between about 15–50% by weight of the solution of cyclohexanone, from between about 20%–70% by weight of the solution of water and the balance being made up of mutual solvent.

Said mutual solvent is preferably selected from the group consisting of methyl alcohol, ethyl alcohol, isopropyl alcohol, tert.-butyl alcohol, acetone, etc.

The drawing illustrates a flow diagram of the process in accordance with my invention.

Generally, in order to recover the components thereof, the coagulation bath must be subjected to distillation and whereby there is obtained:

(1) At the top of the stripping column, the mutual solvent, and in the form of an azeotropic mixture with water;

(2) At the bottom of the stripping column, an emulsion of cyclohexanone and water which should separate into two phases, a first phase consisting of cyclohexanone saturated with water (the organic phase), and a second phase consisting of water saturated with cyclohexanone (the aqueous phase); and from which, by subsequent distillation, there may be obtained pure cyclohexanone.

However, separation of the aforesaid two phases, i.e., separation of the organic and the aqueous phases, is extremely slow, tedious and the process is not feasible on an industrial scale under ordinary working conditions.

It has now been surprisingly found, according to the present invention, that the separation of the two phases is greatly facilitated by increasing the pH of the coagulation bath or the emulsion to values greater than 8.

Said increases in pH values are obtained by adding to the coagulation bath, either prior to distillation, or to the aqueous emulsion of the cyclohexanone that is formed after distillation, an alkaline hydroxide and/or a salt capable of bringing the pH of the bath, or of the emulsion, to a value greater than 8, and preferably to between 11 and 13.

Salts capable of bringing the pH of the coagulation bath, or of the aqueous emulsion, to a value greater than 8 comprise all the salts formed from a strong base and a weak acid, which through hydrolysis effect an alkaline pH, such as, for example, sodium carbonate, sodium bicarbonate, trisodium phosphate, bisodium phosphate, sodium tetraborate, sodium acetate, and the like, as well as the corresponding potassium and lithium salts.

In particular, best results have been obtained by using sodium hydroxide, potassium hydroxide, sodium carbonate, potassium carbonate or mixtures thereof.

According to this invention, the alkaline hydroxide, or salt, that upon hydrolysis effects an alkaline pH, may be added, as mentioned above, either directly to the ternary solution that forms the coagulation bath, e.g., before subjecting same to distillation, or to the emulsion of cyclohexanone and water obtained upon distillation of the coagulating bath.

The alkaline hydroxide, or the salt, may be added as such, as it is soluble in the emulsion, or, preferably, in aqueous solution.

To illustrate further the present invention and the advantages thereof, the following specific examples are given, it being understood that these are merely intended to be illustrative and not limitative.

Example 1

100 parts by weight of polyvinyl chloride, obtained at —40° C. and having a IS-value of about 2.2 and an intrinsic viscosity [$\eta$] of 1.4 dl./gr., were dissolved at 137° C. in 450 parts by weight of cyclohexanone.

This solution was then heated to 135°–137° C., and extruded through a spinneret having 15,000 holes of 100 micron diameter and into a coagulation bath consisting of a ternary mixture comprising:

| | Percent by weight |
|---|---|
| Water | 50 |
| Cyclohexanone | 30 |
| Ethanol | 20 |

1000 litres of the coagulation bath were subjected, after spinning, to distillation, in order to recover the different components of the bath.

From the top of the stripping column was recovered the ethanol in the form of an azeotrope with water, which boils at about 80° C.

From another section of the stripping column there was extracted a stable emulsion consisting essentially of cyclohexanone and water.

Said emulsion was then subjected to a variation in pH by adding different acids, basic salts and bases. The results of the tests are recorded on the following table.

TABLE

| Substance added | pH of the emulsion | Speed of formation of clear layers (cm./min.) |
|---|---|---|
| Hydrochloric acid | 5.5 | 0 |
| Sulfuric acid | 1.3 | 0 |
| Nitric acid | 1.3 | 0 |
| Hydrocloric acid+sodium chloride | 1.8 | 0 |
| Sodium acetate | 8 | 3 |
| Sodium bicarbonate | 8.47 | 4 |
| Sodium carbonate | 11 | 10 |
| Sodium hydroxide | 11.4 | 5 |
| Do | 11.7 | 7 |
| Do | 12 | 12 |
| Potassium hydroxide | 12 | 12 |
| Do | 12.5 | 10 |
| Sodium hydroxide+Sodium carbonate | 11.2 | 10 |

As many apparently widely different embodiments of this invention may be made without departing from the spirit and scope thereof, it is to be understood that the same is not to be limited to the specific embodiments thereof, except as claimed in the appended claims.

What is claimed is:

1. A process for the recovery of cyclohexanone from a coagulation bath comprising a ternary solution of cyclohexanone, water and a mutual solvent therefor, which bath is used in the wet spinning of high syndiotactic polyvinylchloride, comprising subjecting to distillation said coagulation bath comprising a ternary solution of cyclohexanone, water and a mutual solvent therefor; whereby there is obtained as distillation bottoms an emulsion of cyclohexanone and water; allowing said emulsion, the pH thereof having been adjusted to a basic value greater than about 8, to separate into two phases, a first phase consisting of cyclohexanone saturated with water and a second phase consisting of water saturated with cyclohexanone; and thence recovering cyclohexanone from the said separated phases.

2. A process according to claim 1, wherein the pH of the emulsion is adjusted to a basic value greater than about 8 via addition of a compound selected from the group consisting of an alkaline hydroxide or a salt of a strong base and a weak acid.

3. A process according to claim 2, wherein the compound is added subsequent to the distillation and directly to the resulting emulsion of cyclohexanone and water, and further wherein said compound is selected from the group consisting of sodium hydroxide, sodium carbonate, sodium bicarbonate, trisodium phosphate, bisodium phosphate, sodium tetraborate, sodium acetate, the corresponding potassium compounds, the corresponding lithium compounds, and mixtures thereof.

4. A process according to claim 3, wherein the compound is selected from the group consisting of sodium hydroxide, potassium hydroxide, sodium carbonate, potassium carbonate, sodium bicarbonate and potassium bicarbonate.

5. A process according to claim 3, wherein the compound is a mixture consisting of sodium hydroxide and sodium carbonate.

6. A process according to claim 4, wherein the pH is adjusted to a value of from between 11 and 13.

7. A process according to claim 4, wherein the compound is added in the form of an aqueous solution thereof.

8. A process according to claim 4, wherein the coagulation bath consists essentially of from between about 15 percent to 50 percent by weight of the solution of cyclohexanone, from between about 20 percent to 70 percent by weight of the solution of water, and the remainder being composed of a mutual solvent therefor.

9. A process according to claim 8, wherein the mutual solvent is selected from the group consisting of methanol, ethanol, isopropanol, tert-butanol and acetone.

10. A process according to claim 8, wherein the mutual solvent is ethanol.

References Cited

UNITED STATES PATENTS

| 2,617,757 | 11/1952 | Michael | 203—53 |
| 3,111,506 | 11/1963 | Rovssillon et al. | 260—92.8 |
| 3,276,973 | 10/1966 | Burmaster et al. | 203—37 |
| 3,337,670 | 8/1967 | Gord et al. | 264—38 |

FOREIGN PATENTS

| 641,760 | 6/1964 | Belgium. |

NORMAN YUDKOFF, *Primary Examiner.*

D. EDWARDS, *Assistant Examiner.*

U.S. Cl. X.R.

203—37, 39, 95; 264—38

UNITED STATES PATENT OFFICE
CERTIFICATE OF CORRECTION

Patent No. 3,440,148  Dated April 22, 1969

Inventor(s) Melacini et al

It is certified that error appears in the above-identified patent and that said Letters Patent are hereby corrected as shown below:

Column 1, line 6 and 7, delete "ACSA Applicazioni Chimiche S.p.A., Milan, Italy and insert --Chatillon Società Anonima Italiana per le Fibre Tessili Artificiali S.p.A., Milan, Italy-

SIGNED AND
SEALED
DEC 30 1969

(SEAL)
Attest:

Edward M. Fletcher, Jr.
Attesting Officer

WILLIAM E. SCHUYLER, JR.
Commissioner of Patents